(12) United States Patent
Van Den Beukel et al.

(10) Patent No.: US 10,932,437 B2
(45) Date of Patent: Mar. 2, 2021

(54) MANURE REMOVAL VEHICLE FOR REMOVING MANURE FROM AN ANIMAL SHED FLOOR

(71) Applicant: LELY PATENT N.V., Maassluis (NL)

(72) Inventors: Huibrecht Johannes Arjen Van Den Beukel, Maassluis (NL); Gökhan Kemal Özcan, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 383 days.

(21) Appl. No.: 15/770,068

(22) PCT Filed: Oct. 14, 2016

(86) PCT No.: PCT/NL2016/050709
§ 371 (c)(1),
(2) Date: Apr. 20, 2018

(87) PCT Pub. No.: WO2017/069616
PCT Pub. Date: Apr. 27, 2017

(65) Prior Publication Data
US 2018/0303058 A1 Oct. 25, 2018

(30) Foreign Application Priority Data
Oct. 23, 2015 (NL) .................................. NL2015651

(51) Int. Cl.
*A01K 1/01* (2006.01)
*B60P 3/22* (2006.01)

(52) U.S. Cl.
CPC .............. *A01K 1/0128* (2013.01); *A01K 1/01* (2013.01); *B60P 3/225* (2013.01); *B60P 3/2205* (2013.01); *B60P 3/2245* (2013.01)

(58) Field of Classification Search
CPC ....... A01K 1/0128; A01K 1/01; B60P 3/2205; B60P 3/2245; B60P 3/225
See application file for complete search history.

(56) References Cited

U.S. PATENT DOCUMENTS

2011/0296635 A1* 12/2011 Van Meurs .......... A01K 1/0128
15/93.1
2012/0055508 A1* 3/2012 Van Den Berg ..... A01K 1/0128
134/6

FOREIGN PATENT DOCUMENTS

DE          197 04 777 A1    8/1998
DE    20 2006 007 378 U1    7/2006
(Continued)

OTHER PUBLICATIONS

International Search Report, issued in PCT/NL2016/050709, dated Jan. 31, 2017.

(Continued)

*Primary Examiner* — David Redding
(74) *Attorney, Agent, or Firm* — Birch, Stewart, Kolasch & Birch, LLP

(57) ABSTRACT

A wheeled manure-removal vehicle for removing manure from an animal-shed floor includes a scraper assembly for scraping the manure together into a manure-storage space by scraping across the animal-shed floor. The scraper assembly includes a flexible, strip-shaped scraping element which is partly arranged around the manure-storage space and a rolling body. The rolling body extends on a side of the scraping element which faces away from the manure-storage space in order to be in contact with the scraping element at least while scraping the manure together, and has, on the side facing the scraping element, a rolling surface which is convexly rounded towards the scraping element. The use of the rolling body for contact with the scraping element has an advantageous effect on the life of the scraping element on the vehicle.

19 Claims, 3 Drawing Sheets

(56) References Cited

FOREIGN PATENT DOCUMENTS

Figure 1:
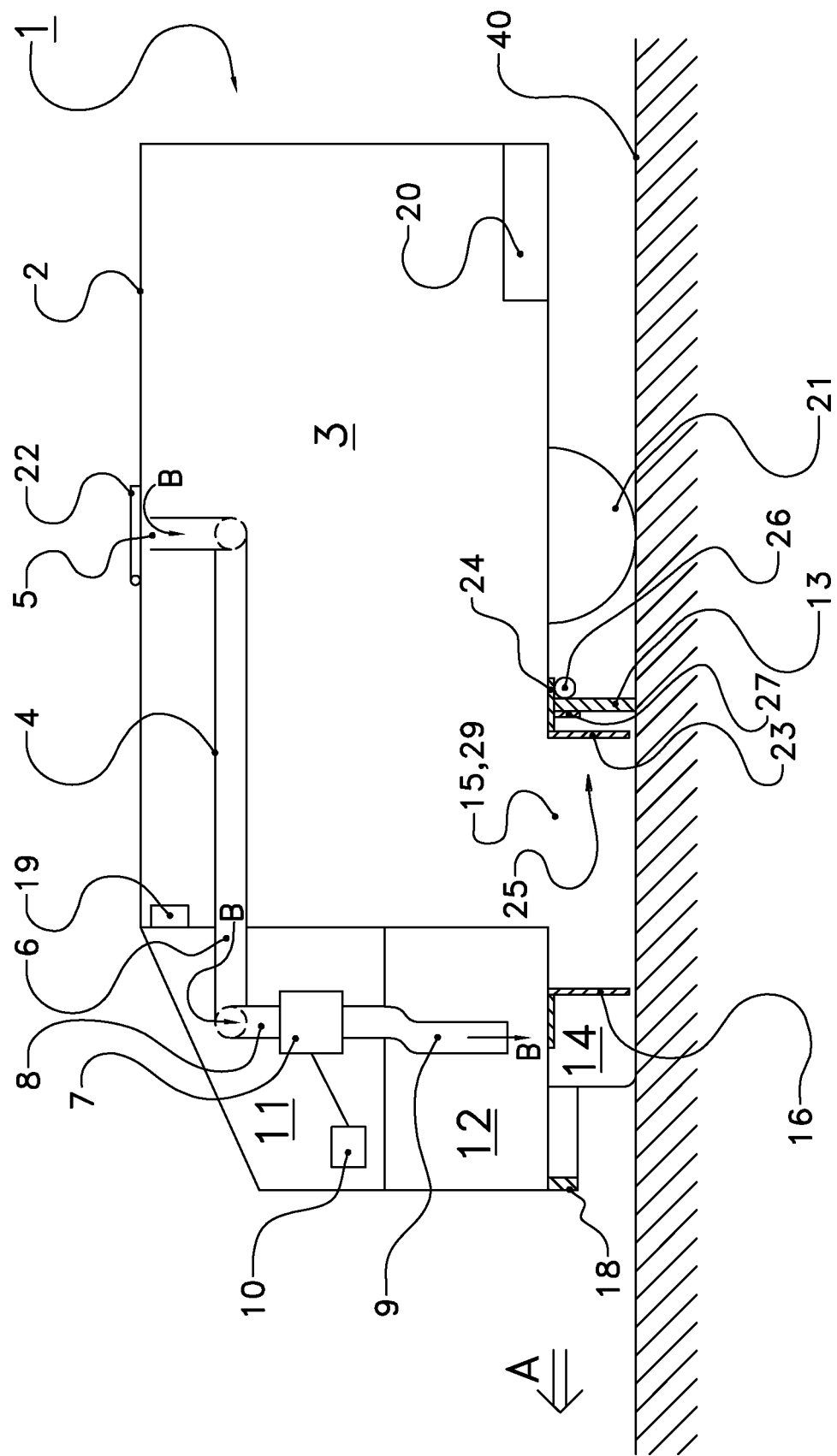

EP            2 441 327  A1    4/2012
WO    WO 2013/010785  A1    1/2013

OTHER PUBLICATIONS

Written Opinion of the International Searching Authority, issued in PCT/NL2016/050709, dated Jan. 31, 2017.

* cited by examiner

MANURE REMOVAL VEHICLE FOR REMOVING MANURE FROM AN ANIMAL SHED FLOOR

The invention relates to a wheeled manure-removal vehicle for removing manure from an animal-shed floor, which vehicle is provided with a scraper assembly for scraping the manure together into a manure-storage space by scraping across the animal-shed floor, wherein the scraper assembly comprises a flexible, strip-shaped scraping element which is partly arranged around the manure-storage space.

The term "manure", as used in the present text, should be understood to be an all-encompassing term for manure and any other dirt which may be present on an animal-shed floor with the manure, such as feed remains. Terms such as "upper" and "top" and "lower" and "bottom", as used in the present text, should be understood to refer to a normal, operational orientation of the vehicle, in which the vehicle can drive across an animal-shed floor to be cleaned and can perform the intended manure-removal function.

A manure-removal vehicle which is provided with a scraper assembly for scraping the manure together in a manure-storage space by scraping across the animal-shed floor is known, for example from WO-2013/010785-A1. The known vehicle is self-propelled and comprises at least two wheels, one motor and a control device for displacing the vehicle in a desired direction of travel by driving at least one of the wheels. The known vehicle furthermore comprises a tank for storing manure, with an air discharge in its top side, and furthermore with a manure supply opening and a manure discharge opening. A vacuum pump which is connected to the control device is provided in order to apply a partial vacuum to the tank via the air discharge. The scraper assembly of the known vehicle comprises a scraping element which, viewed counter to the intended direction of travel, narrows towards a closed end, in which the manure supply opening, viewed in the intended direction of travel, is situated in front of the scraping element and is at least partly surrounded by the scraping element.

For the purpose of collecting manure from an animal-shed floor, the vehicle is activated to drive across the animal-shed floor. During the driving, the scraping element, which is also referred to as manure slide, collects manure and concentrates it at a location near the manure supply opening of the tank, where the manure can be picked up on the basis of the action of the vacuum pump. The scraping element may be made from any suitable material or from any suitable combination of materials, such as steel and rubber. A detail regarding the action of the known vehicle is that a substantially constant amount of manure will accumulate in front of the scraping element, obviously slightly dependent on the supply thereof. The vacuum in the tank created by the pump ensures that the manure is picked up, but as soon as there is insufficient supply or suction power, nothing more will happen really. At most, the manure will no longer be picked up, but it will also not seep from the tank completely due to its own consistency. The manure remains suspended in the tank, as it were, due to the vacuum which prevails in the tank, which vacuum would only increase if the manure were to seep from the tank. In addition, manure is in fact prevented from running out of the tank by the manure which is still in front of the scraping element. The result of all this is that a kind of manure supply is almost permanently situated in front of the scraping element and is pushed across the animal-shed floor when the vehicle moves.

The manure supply opening of the tank of the known vehicle is near the narrowed end of the scraping element. The vehicle is in particular suitable for collecting manure from sealed animal-shed floors. With slatted floors and other floors comprising openings, collecting manure by pushing it together is in fact hardly possible.

With the known vehicle, the manure supply opening and the manure discharge opening coincide in a single opening and this opening is partly, preferably completely, at a bottom level of the tank bottom. At the single opening of the tank of the vehicle, a pipe may be provided by means of which any difference in height between the tank bottom and a location where manure is being picked up can be bridged. Due to the positioning of the single opening in the tank, it is not necessary to provide the pump with a reversing device for discharging manure from the tank in a suitable location, such as over an opening in the animal-shed floor of a manure-storage space situated under the animal-shed floor. The manure will be able to flow out of the tank on account of the force of gravity, certainly when the pump is switched off. A reverse action of the pump is thus not required in this case to achieve a discharge of the manure.

The scraping element has a limited life and has to be replaced from time to time over the course of the total operational life of the manure-removal vehicle. In view thereof, it is an object of the invention to provide measures which are intended to improve the life of the scraping element. The object of the invention is achieved by a wheeled manure-removal vehicle for removing manure from an animal-shed floor, which vehicle is provided with a scraper assembly for scraping the manure together into a manure-storage space by scraping across the animal-shed floor, wherein the scraper assembly comprises a flexible, strip-shaped scraping element which is partly arranged around the manure-storage space and a rolling body, wherein the rolling body extends on a side of the scraping element turned away from the manure-storage space in order to be in contact with the scraping element at least while scraping the manure together, and wherein the rolling body, on the side facing the scraping element, has a rolling surface which is convexly rounded towards the scraping element.

A particular aspect of the manure-removal vehicle according to the invention is related to the application of a rolling body with the scraping element, that is to say the application of a combination of a scraping element and a rolling body which extends along the scraping element. The rolling body serves to at least be in contact with the scraping element while scraping the manure together. This makes it possible, in particular, for the scraping element to roll over the convexly rounded rolling surface of the rolling body while performing its manure-scraping function. Compared to a conventional situation in which no rolling body is used with the scraping element, this reduces stresses which occur in the scraping element during a manure-scraping action, resulting in an improved life of the scraping element and all its associated advantages.

Just as with the manure-removal vehicle known from WO-2013/010785-A1, the manure-removal vehicle according to the invention is particularly suitable for use with sealed animal-shed floors.

In a practical embodiment, the rolling body may have a substantially semicircular shape in cross section on its side facing the scraping element. Irrespective of the exact shape of the convex rolling surface of the rolling body, the scraping element and the rolling body may be fitted on the vehicle in such a way that they bear against each other, but the scraping element and the rolling body may also be fitted on the vehicle in such a way that there is only a slight distance between them, for example a distance of a few millimeters at most, in such a way as to ensure that the scraping element bears against the rolling surface of the rolling body as long as the scraping element is slightly deformed as a result of being dragged across a surface while performing the manure-scraping function.

With a view to the intended function of the scraping element, in particular scraping manure together into a manure-storage space, it is practical if the scraping element is curved in its longitudinal direction, in particular in such a way that the scraping element is concave, viewed in a direction of travel of the vehicle towards the front. In this case, it is advantageous if the rolling surface is also curved in the longitudinal direction of the rolling body, preferably substantially parallel to the scraping element, thus enabling the abovementioned rolling of the scraping element over the rolling surface of the rolling body to take place and providing the advantages of the reduction in stresses in the scraping element while performing a manure-scraping action.

The rolling body may comprise an elongate body, such as a bar or a tube, in which case it is practical if the elongate body has a substantially circular outer periphery. According to the invention, no complicated measures are required in order to achieve an improved life of the scraping element. As mentioned, it is sufficient to fit a bar or tube next to the scraping element so that the scraping element can roll over it during a manure-scraping action.

The vehicle according to the invention may furthermore comprise a holding strip which is designed to form a holder for the scraping element in combination with the rolling body, wherein part of the scraping element is clamped between the rolling body and the holding strip. In practice, the part of the scraping element may be an upper part. The rolling body, the scraping element and the holding strip may be attached to each other using fastening means which extend between the rolling body and the holding strip, through the scraping element. Said fastening means may be, for example, bolts which are spaced apart at regular distances in the longitudinal direction of the rolling body, the scraping element and the holding strip. It is advantageous if a bottom edge of the holding strip is rounded, as this makes it virtually impossible for the holding strip to cut the scraping element when the vehicle is driving backwards.

As is known from the prior art, the vehicle according to the invention may comprise a tank for storing manure. According to the invention, a plate which is fitted under the tank may be provided in that case, which is provided with a manure passage opening for allowing manure to pass from and to the tank at the location of the manure-storage space. In this case, a suction nozzle element may be provided which is attached to the plate at the location of the periphery of the manure passage opening and is in the shape of a short hollow tube segment extending through the plate in a downward direction. The rolling body may also be attached to the plate, at a position which is, viewed in the direction of travel of the vehicle, situated behind the manure passage opening. In general, the plate may serve as a support for a suction nozzle element and preferably also for a combination of a scraping element and a rolling body. This offers advantageous possibilities for cleaning, maintenance, repair and replacement of the suction nozzle element and optionally also the scraping element, because it is then not necessary to carry out work underneath the tank of the vehicle, that is to say, at a relatively low level. Instead, it is then possible to remove the plate from underneath the tank and thus to make the suction nozzle element and optionally also the scraping element readily accessible.

A holder may be provided for the suction nozzle element in order to attach the suction nozzle element to the plate, which holder is attached to the plate and extends at the location of the periphery of the manure passage opening, wherein part of the suction nozzle element is accommodated in the holder and attached to the holder, wherein the holder comprises an assembly of two annular holder elements, and wherein each holder element has a first part which extends in the plane of the plate, and a second part which is integrally connected to the first part and extends through the plate and is bent in a downward direction with respect to the first part. In said construction, the first parts of the holder elements may be attached to each other, and the second parts of the holder elements may be at a distance from each other and hold the part of the suction nozzle element between them. The mutual connection of the parts of the holder elements and the part of the suction nozzle element may be ensured, for example, by means of glue.

An example of a suitable material for both the suction nozzle element and the holder for the suction nozzle element is rubber. The suction nozzle element primarily serves to form a lowered inlet for manure to be picked up. In that case, even thinly liquid substances can be picked up from the animal-shed floor. In view thereof, it is advantageous if the suction nozzle element and its holder have flexible characteristics, so that a degree of movement of the suction nozzle element with respect to the plate is possible, which may be particularly important when the suction nozzle element comes into contact with bumps and/or obstacles on the animal-shed floor to be cleaned.

Suitable sealing material, such as foam material, may be arranged on the holder, at an upper side of the plate and the holder for the suction nozzle element, in order to seal the suction nozzle element, as accommodated in the holder, against the tank of the vehicle. Since this ensures that no air leak occurs at the suction nozzle element, manure may be picked up in an optimum efficient manner.

It is particularly practical when a dimension of the plate is sufficient to have free access to a part of the plate on two sides of the vehicle, in particular a part of the plate which serves to attach the plate to the vehicle. The plate and the components attached thereto can then be fitted to the vehicle and removed from the vehicle in a simple manner, so that it is not necessary to carry out work in the very limited space below the tank of the vehicle, for example if it is desired to fit the plate on the vehicle and remove it from the vehicle, or if it is desired to carry out maintenance on one or more of the components or to clean, repair or replace one or more of the components.

The vehicle is preferably self-propelled, meaning it can be a manned or an autonomous self-propelled vehicle. A self-propelled vehicle preferably comprises a battery and a connector for connection to an external battery-charging means for the purpose of charging the battery.

The invention furthermore relates to an assembly of a plate with a manure passage opening, a suction nozzle element which is attached to the plate at the location of the periphery of the manure passage opening, and a combination of a scraping element and a rolling body which is attached to the plate and extends along the scraping element, for fitting underneath the tank of a manure-removal vehicle which has such a tank for storing manure. The installation may be carried out in a simple manner, for example using bolt or the like. Such an assembly has the advantage that it can easily be removed from or replaced on the vehicle to which it is fitted. In view of the difficult circumstances under which the vehicle is used, it is a significant advantage if a heavily used component such as this assembly can be replaced quickly, and the replaced assembly can subsequently, for example, be reconditioned, cleaned, etc.

In accordance with the above explanation, such an assembly may furthermore comprise a holding strip which extends on the side of the scraping element facing the suction nozzle element, wherein the scraping element is then held securely between the rolling body and the holding strip. The plate is preferably provided with two fastening plates which are a sufficient distance apart to be readily accessible when fitting the assembly underneath the vehicle. The other features and particular forms which are described for the vehicle in the claims and/or the above description also apply advantageously, where possible, to the assembly.

Figure 2:
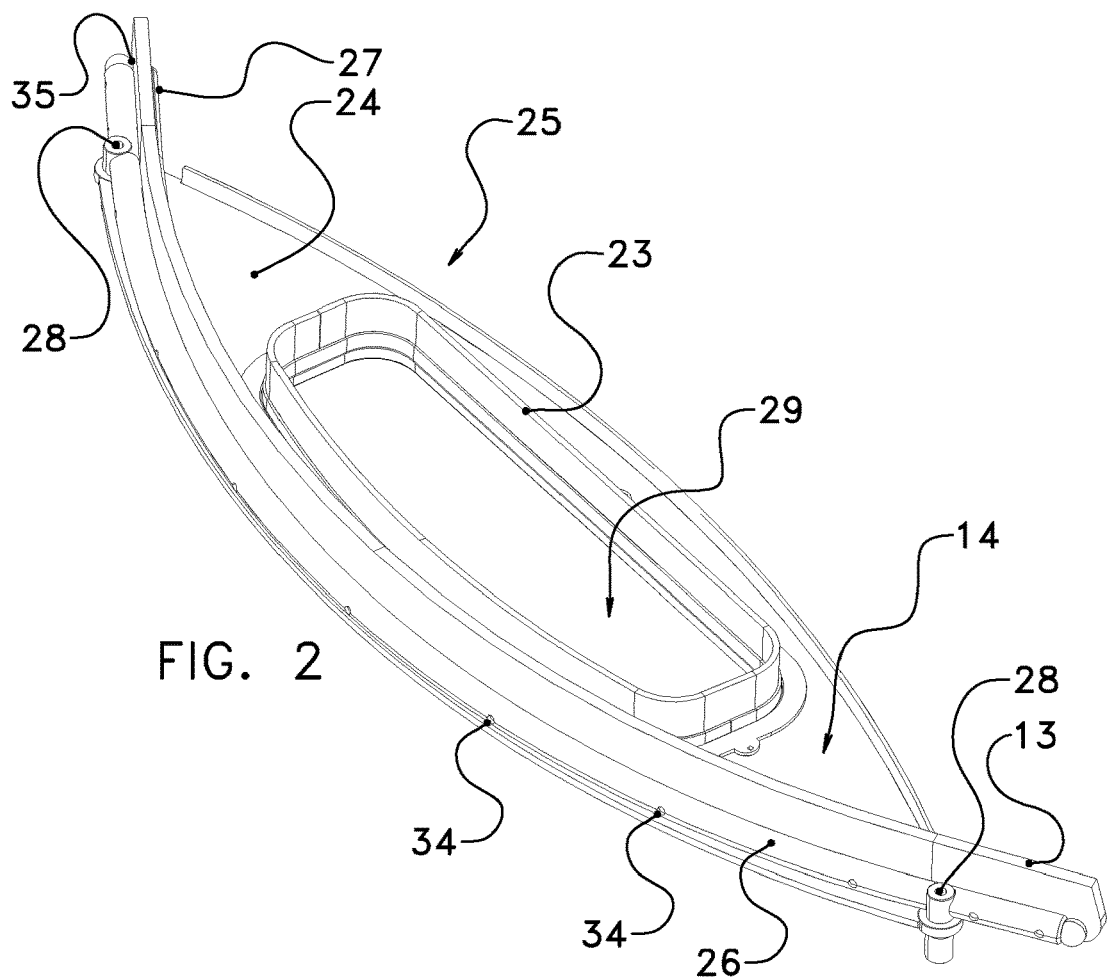
Figure 3:
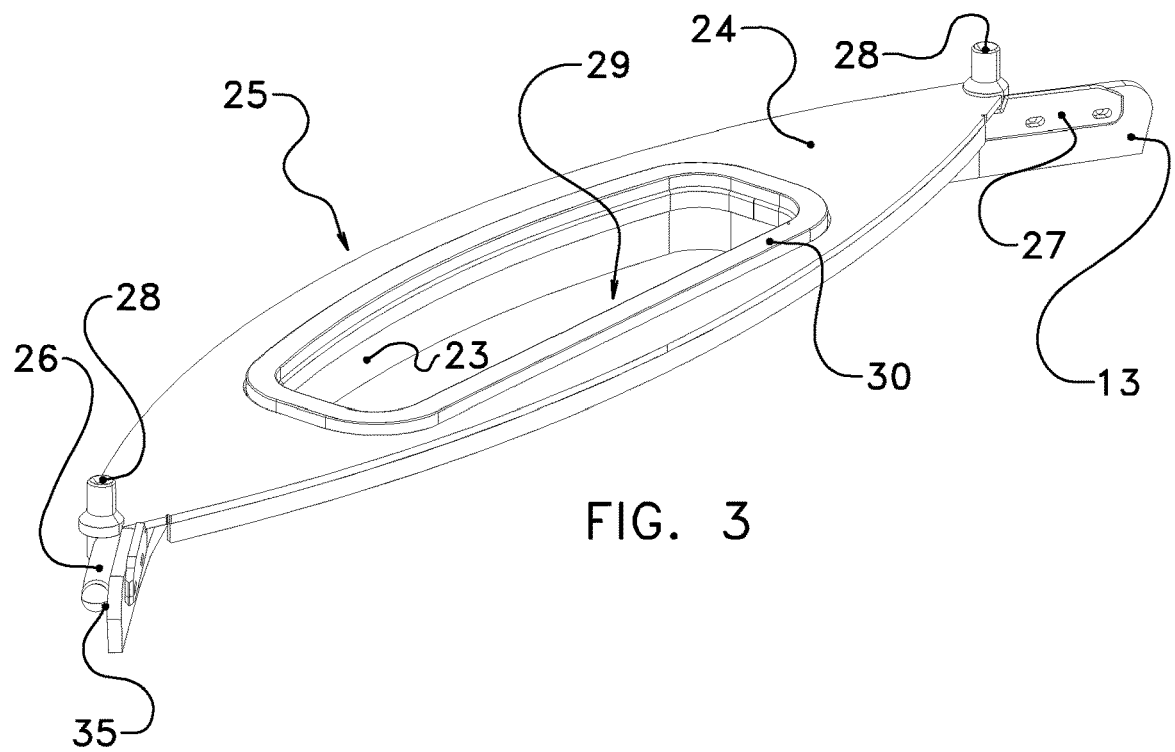
Figure 4:
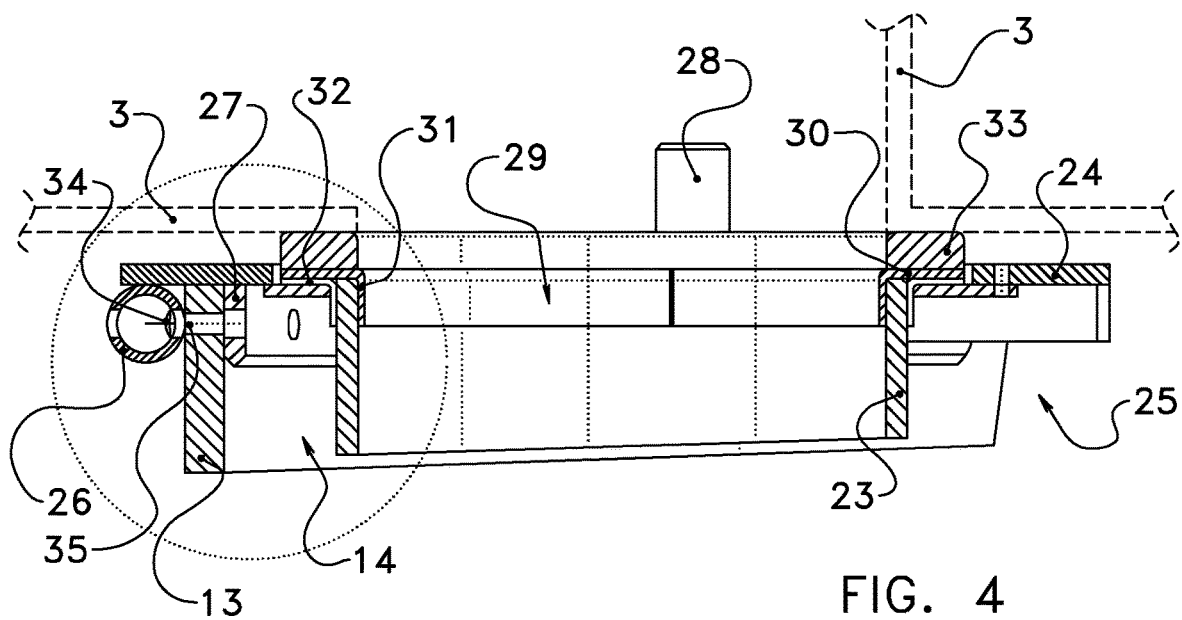
Figure 5:
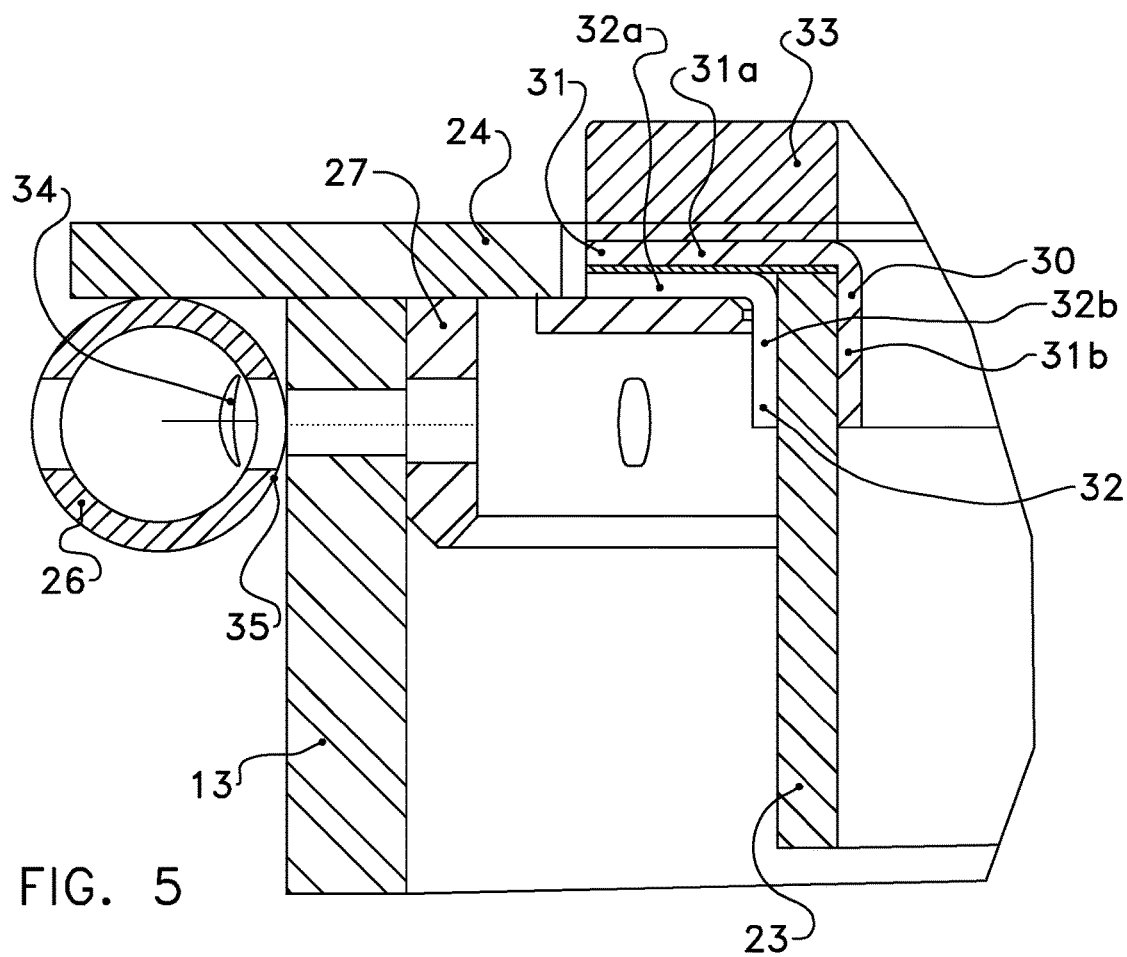

The aforesaid and other aspects of the invention will be explained below by means of the drawing, which shows a non-limiting exemplary embodiment of the invention, and in which:

FIG. 1 diagrammatically shows a sectional view of a manure-removal vehicle according to the invention, FIGS. 2 and 3 diagrammatically show a perspective view of an assembly which forms part of the vehicle illustrated in FIG. 1, comprising a plate, a suction nozzle element and a scraping element, in which an underside of the assembly is directed forwards in FIG. 2 and an upper side of the assembly is directed forwards in FIG. 3, FIG. 4 diagrammatically shows a sectional view of the assembly illustrated in FIGS. 2 and 3, and FIG. 5 diagrammatically shows a detail of the sectional view from FIG. 4.

FIG. 1 shows a manure-removal vehicle 1 according to the invention. The vehicle 1 comprises a tank 2 with a manure-storage space 3. At the top, the manure-storage space 3 has an air discharge 4 with an air intake aperture 5 and an air-discharge aperture 6. The vehicle 1 furthermore comprises a pump 7 with an intake pipe 8 and an expelling pipe 9. The pump 7 and a control device 10 for the pump 7 are situated in a control space 11 which is provided next to the manure-storage space 3. Below the control space 11, there is an expelling space 12.

A scraping element 13 delimits the rear side of a manure-storage space 14 which is in communication with a manure inlet opening 15 to the tank 2 via a suction nozzle element 16, 23. At the very front, there is an optional front pusher 18. FIG. 1 furthermore shows a level sensor 19, a battery 20, one of two wheels 21, and a cover 22 of the vehicle 1.

In the illustrated example, the volume of the tank 2, or the manure-storage space 3, viewed in a direction of travel of the vehicle 1 which is indicated in FIG. 1 by an arrow A, is symmetrical with respect to the wheels 21. One of the effects this has is that no tilting of the tank 2 occurs during filling of the manure-storage space 3 which could otherwise have an effect on the floor pressure on the scraping element 13.

In the illustrated example, the air intake aperture 5 of the air discharge 4 is situated at the top of the manure-storage space 3. Due to this, the manure-storage space 3 can be filled to a maximum degree. In order to prevent too much manure from being sucked in and ending up in the pump via the air extractor system, indicated by the arrows B, the abovementioned level sensor 19 is provided which can switch off the pump 7, if desired, when an excessive level is reached. Should any manure, dirt, etc. end up in the air discharge 4 and in the pump 7, these can be cleaned in a simple manner by opening the cover 22 and flushing them, for example with water and/or another suitable cleaning agent. FIG. 1 shows how the cover 22 may be in a position on top of the tank 2, which does not preclude that it may also be incorporated in the top side of the tank 2. An example of the total height of the vehicle 1 is a height of 60 cm, due to which it can pass under standard fences in dairy farming. Obviously, other heights of the vehicle 1 are also possible within the scope of the invention.

The intake pipe 8 of the pump 7 is in principle connected to the air discharge 4. The pump 7 and the control unit 10 for controlling the pump 7 and possibly also other components, such as the motor and wheels 21 of the vehicle 1, are situated in the control space 11 which is practically inaccessible by material from the manure-storage space 3. The pump 7 is preferably a so-called dirty water pump, as are known for use on ships and the like. This type of pump is particularly well able to withstand (extremely) dirty water and the like, and therefore also manure, which is advantageous in case manure unintentionally ends up in the pump 7. In practice, the pump 7 may require very low power. Thus, the partial vacuum which is to be generated in the manure-storage space 3 does not have to be in excess of 0.06 bar at a tank height of 60 cm. In addition, the air discharge speed does not have to be great either; in principle, it is sufficient if the air discharge speed is as high as the manure supply speed. The latter speed obviously depends on the driving speed of the vehicle 1 and the thickness of the manure layer to be collected. In practice, a flow rate of a few tens of liters per minute is already sufficient to keep a dairy animal shed sufficiently clean. Due to the required power being low, it is highly feasible in practice for the vehicle 1 according to the invention to be designed as an autonomous vehicle with its own power supply.

Viewed in the direction of travel A of the vehicle 1, the manure inlet opening 15 and the suction nozzle element 16, 23 which gives access to the manure inlet opening 15 are situated at the end of the manure-storage space 14 which, on one side, is delimited by the scraping element 13 and, on the other side, by the front part 16 of the suction nozzle element 23. Thus, manure to be collected and sucked up can pass under the front part 16 and reach the manure-storage space 14, so that a supply of manure is in principle continuously present in said location when the vehicle 1 is moving. It is advantageous to continuously provide manure at the manure inlet opening 15, so that no air but only manure is sucked up to the tank 2. If desired, an additional amount of manure may be sucked up from a position in front of and/or next to the front part 16, in case a manure buffer has formed there.

At the front of the vehicle 1, there is a front pusher 18 which is able to prevent foreign bodies, such as stones and the like, from ending up underneath the vehicle 1. The front part 16 is preferably flexible, so that bodies which are relatively large, but can still pass under the front pusher 18, such as grass clumps and the like, can still be reliably discharged by bending the front part 16, namely via the manure inlet opening 15. The degree to which the front pusher 18 extends from the vehicle 1 downwards is selected such that relatively large chunks which are unable to pass under the sealing panel 16 which is bent to a maximum degree, are efficiently blocked by the front pusher 18. Incidentally, it is also possible for the entire suction nozzle element 16, 23 to be flexible, such as made of one and the same material and of the same thickness.

The drive mechanism of the wheels 21 of the vehicle 1 is powered electrically by the battery 20 and controlled by the control unit 10. The scraping element 13 may serve as a third support for the vehicle 1 on a substrate, in particular an animal-shed floor 40 to be cleaned. However, it is also possible for a swivel wheel (not shown) or the like to be provided as a third support for the vehicle 1. This option is advantageous with regard to steering the vehicle 1.

In the vehicle 1, the scraping element 13 and the suction nozzle element 16, 23 form part of an assembly 25 which furthermore includes a common plate 24 on which said elements 13, 16, 23 are fitted, and which will be denoted below as functional assembly 25. Details of the functional assembly 25, which is only shown diagrammatically in FIG. 1, will be explained in more detail with reference to FIGS. 2-5. FIGS. 2-5 show that the functional assembly 25 not only comprises the scraping element 13, the suction nozzle element 16, 23 and the common plate 24, but that more components are present on the plate 24. In particular, these are a rolling body 26 and a holding strip 27 which extend on either side of an upper part of the scraping element 13. Below, the various components of the functional assembly 25 will be explained in more detail.

The plate 24 of the functional assembly 25 is designed to be fixed underneath the tank 2 of the vehicle 1. In the illustrated example, the plate 24 is provided with two fastening plates 28, positioned at a distance from each other, for receiving means such as bolts for fastening the plate 24 to the vehicle 1. The distance between these fastening plates 28 is adapted to a width of the vehicle 1, that is to say a horizontal dimension of the vehicle 1 at right angles to the direction of travel A, at the position of the vehicle 1 which is an installation position of the plate 24. In particular, the distance between the fastening plates 28, and thus a width of the plate 24, is chosen such that the fastening plates 28 are always readily accessible. In particular, when the plate 24 is in the intended installation position, one fastening location 28 may be accessed from one side of the vehicle 1 and the other fastening location 28 may be accessed from the other side of the vehicle 1.

Stainless steel is a suitable material for the plate 24. The plate 24 is provided with a manure passage opening 29, the shape and dimensions of which are adapted to the shape and dimensions of the manure inlet opening 15 to the tank 2 of the vehicle 1 in such a way that when the plate 24 is fitted at the installation position, the manure passage opening 29 of the plate 24 leaves the manure inlet opening 15 clear. FIG. 1 shows that the front part 16 of the suction nozzle element 16, 23, viewed in the intended direction of travel, is situated in front of the front wall of the tank 2 and in particular in front of the front edge of the manure inlet opening 15 for the tank. In use, the part 16 can then be bent backwards without covering the manure inlet opening 15. This bending occurs in particular with relatively large chunks of manure or stones and the like, in which case it is quite important that the opening 15 is as large as possible. Incidentally, the manure passage opening 29 preferably runs forward beyond the manure inlet opening 15, so that the part 16 is able to bend backwards and upwards in an optimum manner, i.e. partly as far as into the opening 29, but not into the opening 15.

In the illustrated example, the manure passage opening 29 generally has the shape of a rectangle with rounded corners, at least the dimension of the manure passage opening 29 is significantly smaller in the illustrated example in the direction of travel A of the vehicle 1 than the dimension of the manure passage opening 29 in a direction at right angles thereto, which does not preclude that other shapes of the manure passage opening 29 are conceivable without departing from the scope of the invention, such as round or coil-shaped (oval with pointed ends).

The suction nozzle element 16, 23 is fitted to the plate 24 at the location of the periphery of the manure passage opening 29. The suction nozzle element 16, 23 generally, but not only, has the shape of a short tube segment extending through the plate 24 or from the plate 24 downwards, and having, in the illustrated example, an outer periphery which has the same shape as the periphery of the manure passage opening 29, i.e. generally the shape of a rectangle with rounded edges. During use of a vehicle 1 in which the functional assembly 25 can be used, manure which is located in the manure-storage space 14, is picked up at the location of the free end of the suction nozzle element 16, 23, following which the manure moves further upwards through the suction nozzle element 16, 23, then successively passes through the manure passage opening 29 in the plate 24 and the manure inlet opening 15 to the tank 2, and ends up in the tank 2. The height of the suction nozzle element 16, 23 is chosen such that when the functional assembly 25 is situated at the installation position on the vehicle 1 and the vehicle 1 is situated on a surface, such as an animal-shed floor, the free end of the suction nozzle element 16, 23 is situated at most at a small distance above the surface.

A flexible material, such as rubber, is a suitable material for the suction nozzle element 16, 23. For example, the suction nozzle element 16, 23 is glued to the plate 24. It is also possible to assemble the suction nozzle element from two strips, the ends of which are clamped between respective clamping parts made of metal or the like, and which together form a coil-shaped manure passage opening. The clamping parts may in turn be attached to the plate 24. In this case, the parts 16 and 23 of the suction nozzle element are two separate parts which are clamped together. However, for the sake of convenience, it is assumed that there is one continuous suction nozzle element 23, in which reference numeral 16 then denotes the part of the suction nozzle element 23 which is furthest to the front in the intended direction of travel.

The details of a possible way in which the suction nozzle element 16, 23 may be attached to the plate 24 will be explained below. As the suction nozzle element 16, 23 is fixed to the plate 24, the suction nozzle element 16, 23 can readily bend in the horizontal direction and can be stiff in the vertical direction.

In the sectional views from FIGS. 4 and 5, it can clearly be seen that the functional assembly 25 comprises a holder 30 attached to the plate 24, in which or on which a top part of the suction nozzle element 16, 23 is accommodated. In the illustrated example, the holder 30 comprises two annular holder elements 31, 32, one of which will be referred to below as the top holder element 31 and another one as bottom holder element 32. Each of the holder elements 31, 32 has a first part 31a, 32a which extends in the plane of the plate 24 and a second part 31b, 32b which is integrally connected to the first part 31a, 32a and is bent downwards with respect to the first part 31a, 32a to extend downwards from the plane of the plate 24, in particular in a substantially vertical direction. The first parts 31a, 32a of the holder elements 31, 32 are glued together and the second parts 31b, 32b of the holder elements 31, 32 extend at a distance apart, wherein the abovementioned top part of the suction nozzle element 16, 23 is glued between the second parts 31b, 32b of the holder elements 31, 32. In this way, a strong and sealed connection of the suction nozzle element 16, 23 to the plate 24 is achieved.

FIGS. 4 and 5 also show an application of sealing material on top of the holder 30 for the suction nozzle element 16, 23. In the illustrated example, the sealing material is provided in form of a ring 33 of foam material. During fitting of the functional assembly 25 onto the underside of the tank 2 of a manure-removal vehicle 1, the foam material is compressed when the plate 24 is pulled against the tank 2. In this way, the connection of the suction nozzle element 16, 23 to the tank 2 is sealed.

In the illustrated example, the scraping element 13 is made of rubber and has the shape of an elongate strip which extends across the width of the plate 24 like a wiper blade. The scraping element 13 extends substantially vertically with respect to the plate 24, on the underside of the plate 24 where the suction nozzle element 16, 23 also extends, wherein an underside of the scraping element 13 is situated at a slightly lower level with respect to the plate 24 than an underside of the suction nozzle element 16, 23, as can clearly be seen in FIGS. 4 and 5. This has the result that when the functional assembly 25 is fitted to a vehicle 1 and the vehicle 1 is moved across an animal-shed floor 40, the scraping element 13 actually scrapes across the animal-shed floor 40 while the suction nozzle element 16, 23 can pick up the manure accumulated in the manure-storage space 14 situated in front of the scraping element 13 at a slightly higher level. The scraping element 13 extends in a curved orientation across the plate 24, with the concave side directed to the front, that is to say directed towards the suction nozzle element 16, 23, and with the convex side directed to the back. For the sake of completeness, it should be noted that the expressions "to the front" and "to the back" should be interpreted as referring to the application of the functional assembly 25 in a manure-removal vehicle 1, and to the intended normal, forward direction of travel A of such a vehicle 1.

As indicated earlier, a top part of the scraping element 13 is situated between a rolling body 26 and a holding strip 27. The rolling body 26 is situated on the rear side of the scraping element 13, that is to say on the side of the scraping element 13 turned away from the suction nozzle element 16, 23, while the holding strip 27 extends on the other side of the scraping element 13. In the illustrated example, the rolling body 26, the scraping element 13 and the holding strip 27 are arranged concentrically with respect to each other, with the rolling body 26 and the holding strip 27 extending along virtually the entire length of the scraping element 13. The rolling body 26 is fixedly attached to the plate 24. In the illustrated example, the upper parts of the scraping element 13 and the holding strip 27 are fixed against the rolling body 26 by means of bolts 34.

In the illustrated example, the rolling body 26 has the shape of a tube with a substantially circular outer periphery in cross section. This has the advantage that the rolling body 26 makes contact with the scraping element 13 over a convex rolling surface 35. When the functional assembly 25 is fitted on a vehicle 1 and the scraping element 13 performs the intended manure-scraping function, the upper part of the scraping element 13 rolls over the rolling surface 35 on account of movements in the other part of the scraping element 13, in particular movements in a bottom part of the scraping element 13. This has the result that stresses which are generated on account of said movements, in particular at the location of the upper part of the scraping element 13, can be minimized, thus also minimizing the risk of fatigue and breakage of the scraping element 13. With a view to the desire to prevent breakage of the scraping element 13, it is furthermore provided that a bottom edge of the holding strip 27 has a rounded shape. When the scraping element 13 bends under the holding strip 27 due to a rearward movement of the vehicle 1, the scraping element 13 comes into contact with the bottom edge of the holding strip 27, but this does not do any damage to the scraping element 13 due to the rounded shape of the bottom edge of the holding strip 27.

As has been noted earlier, overall the functional assembly 25 is simple to fit under a manure-removal vehicle 1 or to remove from the vehicle 1 by using the two fastening plates 28 which are provided on the plate 24. This offers many advantageous possibilities with regard to cleaning, repair, replacement etc. of the components which form part of the functional assembly 25 and which are important when the vehicle 1 performs the manure-scraping function.

It will be clear to those skilled in the art that the scope of the invention is not limited to the above-described examples, but that various variations and modifications thereof are possible without departing from the scope of the invention as defined in the attached claims.

The manure-removal vehicle 1 according to the invention may be fitted with more components than described above. Thus, the vehicle 1 may be equipped with one or more spray nozzles and an associated liquid supply in order to be able to wet a section of an animal-shed floor 40 to be cleaned prior to performing the manure-scraping function on that section, which may assist the scraping together of the manure.

As is known from WO-2013/010785-A1, the manure supply opening 15 may also serve as a manure discharge opening. This means that when the manure is to be removed from the tank 2 and the vehicle 1 is to this end positioned over the opening of a manure-storage space, the manure can be removed from the tank 2 via the opening 15 with the—in that case combined—supply and discharge function.

The invention claimed is:

1. A wheeled manure-removal vehicle for removing manure from an animal-shed floor, the vehicle being provided with a scraper assembly for scraping the manure together into a manure-storage space by scraping across the animal-shed floor,
wherein the scraper assembly comprises a flexible, strip-shaped scraping element which is partly arranged around the manure-storage space and a rolling body,
wherein the rolling body extends on a side of the scraping element turned away from the manure-storage space in order to be in contact with the scraping element at least while scraping the manure together, and
wherein the rolling body, on the side facing the scraping element, has a rolling surface which is convexly rounded towards the scraping element,
wherein the rolling body has a substantially semicircular shape in cross section on a side thereof facing the scraping element.

2. The vehicle as claimed in claim 1, wherein the scraping element is curved in a longitudinal direction thereof, and wherein the rolling surface is also curved in a longitudinal direction of the rolling body.

3. The vehicle as claimed in claim 1, wherein the rolling body comprises an elongate body.

4. A wheeled manure-removal vehicle for removing manure from an animal-shed floor, the vehicle being provided with a scraper assembly for scraping the manure together into a manure-storage space by scraping across the animal-shed floor,
wherein the scraper assembly comprises a flexible, strip-shaped scraping element which is partly arranged around the manure-storage space and a rolling body,
wherein the rolling body extends on a side of the scraping element turned away from the manure-storage space in order to be in contact with the scraping element at least while scraping the manure together, wherein the rolling body, on the side facing the scraping element, has a rolling surface which is convexly rounded towards the scraping element, and wherein the vehicle comprises a holding strip designed to form a holder for the scraping element in combination with the rolling body, wherein part of the scraping element is clamped between the rolling body and the holding strip.

5. The vehicle as claimed in claim 4, wherein the rolling body, the scraping element and the holding strip are attached to each other using a fastener extending between the rolling body and the holding strip, through the scraping element.

6. The vehicle as claimed in claim 4, wherein a bottom edge of the holding strip is rounded.

7. A wheeled manure-removal vehicle for removing manure from an animal-shed floor, the vehicle being provided with a scraper assembly for scraping the manure together into a manure-storage space by scraping across the animal-shed floor, wherein the scraper assembly comprises a flexible, strip-shaped scraping element which is partly arranged around the manure-storage space and a rolling body, wherein the rolling body extends on a side of the scraping element turned away from the manure-storage space in order to be in contact with the scraping element at least while scraping the manure together, wherein the rolling body, on the side facing the scraping element, has a rolling surface which is convexly rounded towards the scraping element, and wherein the vehicle comprises:

a tank for manure storage;

a plate fitted under the tank and provided with a manure passage opening for allowing manure to pass from and to the tank at the location of the manure-storage space; and a suction nozzle element attached to the plate at the location of the periphery of the manure passage opening, the suction nozzle element being in the shape of a short hollow tube segment extending through the plate in a downward direction.

8. The vehicle as claimed in claim 7, wherein the rolling body is attached to the plate, at a position which is, viewed in the direction of travel of the vehicle, situated behind the manure passage opening.

9. The vehicle as claimed in claim 7, further comprising a holder for the suction nozzle element, the holder being attached to the plate and extending at the location of the periphery of the manure passage opening, wherein part of the suction nozzle element is accommodated in the holder and attached to the holder, wherein the holder comprises an assembly of two annular holder elements, and wherein each holder element has a first part extending in the plane of the plate, and a second part integrally connected to the first part and extending through the plate and bent in a downward direction with respect to the first part.

10. The vehicle as claimed in claim 9, wherein the first parts of the holder elements are attached to each other, and wherein the second parts of the holder elements are at a distance from each other and hold the part of the suction nozzle element therebetween.

11. The vehicle as claimed in claim 9, wherein material is arranged on the holder, on an upper side of the plate and the holder for the suction nozzle element, the material serving to seal the suction nozzle element, as accommodated in the holder against the tank of the vehicle.

12. The vehicle as claimed in claim 7, wherein a dimension of the plate is sufficient to have free access to a part of the plate on two sides of the vehicle.

13. The vehicle as claimed in claim 1, wherein the vehicle is self-propelled.

14. An assembly of a plate with a manure passage opening, a suction nozzle element attached to the plate at the location of the periphery of the manure passage opening, and a combination of a scraping element and a rolling body attached to the plate and extending along the scraping element, for fitting underneath the tank of the vehicle as claimed in claim 7.

15. The vehicle as claimed in claim 1, wherein the scraping element is curved in a longitudinal direction thereof, and wherein the rolling surface is also curved in a longitudinal direction of the rolling body, substantially parallel to the scraping element.

16. The vehicle as claimed in claim 1, wherein the rolling body comprises an elongate body having a substantially circular outer periphery.

17. The vehicle as claimed in claim 7, wherein a dimension of the plate is sufficient to have free access to a part of the plate on two sides of the vehicle, the part of the plate serving to attach the plate to the vehicle.

18. The vehicle as claimed in claim 2, wherein the rolling body comprises an elongate body.

19. The vehicle as claimed in claim 1, wherein the scraping element is located rearwardly of the manure-storage space, and wherein the scraping element is curved in a longitudinal direction thereof.

* * * * *